United States Patent [19]

Takeuchi et al.

[11] Patent Number: 5,670,276
[45] Date of Patent: *Sep. 23, 1997

[54] ALTERNATE SYNTHETIC METHOD FOR MIXED METAL OXIDE CATHODE MATERIALS

[75] Inventors: Esther S. Takeuchi, East Amherst; Randolph A. Leising, Williamsville, both of N.Y.

[73] Assignee: Wilson Greatbatch Ltd., Clarence, N.Y.

[*] Notice: The term of this patent shall not extend beyond the expiration date of Pat. No. 5,472,810.

[21] Appl. No.: 567,362

[22] Filed: Dec. 4, 1995

[51] Int. Cl.⁶ .................................................. H01M 4/02
[52] U.S. Cl. ........................................ 429/219; 429/220
[58] Field of Search .............................. 429/218, 219, 429/220, 194, 192; 423/592, 593

[56] References Cited

U.S. PATENT DOCUMENTS

| | | |
|---|---|---|
| 3,445,290 | 5/1969 | Elliott et al. ............................ 136/83 |
| 3,734,897 | 5/1973 | Stoy ..................................... 260/79.3 |
| 4,286,029 | 8/1981 | Murakami et al. ................... 429/219 |
| 4,310,609 | 1/1982 | Liang et al. ......................... 429/194 |
| 4,338,385 | 7/1982 | Ohya et al. .......................... 429/206 |
| 4,370,395 | 1/1983 | Naguara et al. ..................... 429/219 |
| 4,830,940 | 5/1989 | Keister et al. ....................... 429/194 |
| 4,913,782 | 4/1990 | Seiger ................................. 204/2.1 |
| 5,194,342 | 3/1993 | Bito et al. ........................... 429/191 |
| 5,453,337 | 9/1995 | Willmann ............................ 429/218 |
| 5,472,810 | 12/1995 | Takeuchi et al. ................... 429/218 |
| 5,516,340 | 5/1996 | Takeuchi et al. ................... 429/218 |

*Primary Examiner*—M. Nuzzolillo
*Attorney, Agent, or Firm*—Hodgson, Russ, Andrews, Woods & Goodyear LLP

[57] ABSTRACT

The present invention related to an electrochemical cell comprising an anode of a Group IA metal and a cathode of a composite material prepared from a combination of vanadium oxide and either a copper or a silver oxide and the other of a copper or a silver nitrate. The cathode material of the present invention provides an increased gravimetric energy density over the cathode active materials of the prior art along with an increased pulse voltage delivery capacity. This makes the cathode material of the present invention particularly useful for implantable medical applications.

34 Claims, 9 Drawing Sheets

ALTERNATE SYNTHETIC METHOD FOR MIXED METAL OXIDE CATHODE MATERIALS

FIELD OF THE INVENTION

This invention relates to the art of electrochemical cells, and more particularly, to a new and improved electrochemical cell, and a cathode therefore. The cell comprises a Group IA anode and a new composite metal-metal oxide-metal oxide cathode material. Still more particularly, the present invention is directed to the preparation of copper-silver-vanadium oxide, $Cu_fAg_rV_2O_z$ (CSVO), from vanadium oxide combined with a copper nitrate and silver oxide or copper oxide and silver nitrate. This cathode materials is useful in alkali metal cells.

Alkali metals have exceptionally high energy density when employed as the anode material in electrochemical cells owing to their low atomic weight and high standard potential. However, the high chemical activity of alkali metal materials in electrochemical cells requires the use of nonaqueous electrolytes and a cathode which meets the rigorous requirements for such a cell chemistry. Most cathode materials are too readily soluble in nonaqueous electrolytes; however, the mixed metal oxide of the present invention containing copper, silver, and vanadium exhibits reduced reactivity with nonaqueous electrolytes which helps prevent depletion of the cell's capacity after storage. Thus the tri-metallic compound of the present invention is well suited as an electrode material for application as a cathode in an alkali metal electrochemical cell, such as a lithium cell.

PRIOR ART

It is known to use metal oxides as cathode materials in nonaqueous electrochemical cells. For example, U.S. Pat. No. 4,310,609 to Liang et al., which is assigned to the assignee of the present invention and incorporated herein by reference, discloses a metal oxide composite cathode comprising metals and metal oxides. The cathode is prepared from readily decomposable precursor compounds, including nitrates of vanadium, silver and copper, decomposed in a combined state, or individually decomposed and thereafter combined in an oxide/decomposable metal salt compound and subsequently decomposed to form the metal oxide composite cathode. More specifically, the preferred cathode composites are prepared by decomposing a vanadium salt, suitably ammonium metavanadate, to produce vanadium pentoxide. A decomposable metal salt, suitably the nitrate of a second metal is then added to the vanadium pentoxide. The second metal is preferably selected from the group consisting of silver, copper, manganese and mixtures thereof. The resultant composite cathode material includes $V_2O_z$ wherein $x \leq 5$ combined with one or more of $Ag_2O_z$ wherein $x=0$ to 1; $CuO_z$ wherein $x=0$ to 1; and $MnO_z$ wherein $x=1$ to 3. The composite material is described as a metal oxide-metal oxide, a metal-metal oxide, or a metal-metal oxide-metal oxide. A preferred embodiment of this cathode material has the formula $AgV_2O_{5.5}$, also referred to as SVO.

The Liang et al. patent does not specifically disclose combining vanadium pentoxide with silver and copper as a preparation for the trimetallic compound copper-silver vanadium oxide. In that light, Liang et al. does not specifically disclose a mixture of vanadium pentoxide combined with copper nitrate and silver oxide or copper oxide and silver nitrate, such as is disclosed by the present invention.

SUMMARY OF THE INVENTION

The present invention related to an electrochemical cell comprising an anode of a Group IA metal and a cathode of a composite material prepared from a combination of vanadium oxide and either a copper or a silver oxide and the other of a copper or a silver nitrate. The cathode material of the present invention provides an increased gravimetric energy density over the cathode active materials of the prior art along with an increased pulse voltage delivery capacity. This makes the cathode material of the present invention particularly useful for implantable medical applications.

The foregoing and additional advantages and characterizing features of the present invention will become apparent from the following detailed description taken in conjunction with the drawings.

DETAILED DESCRIPTION OF THE INVENTION

Figure 1:
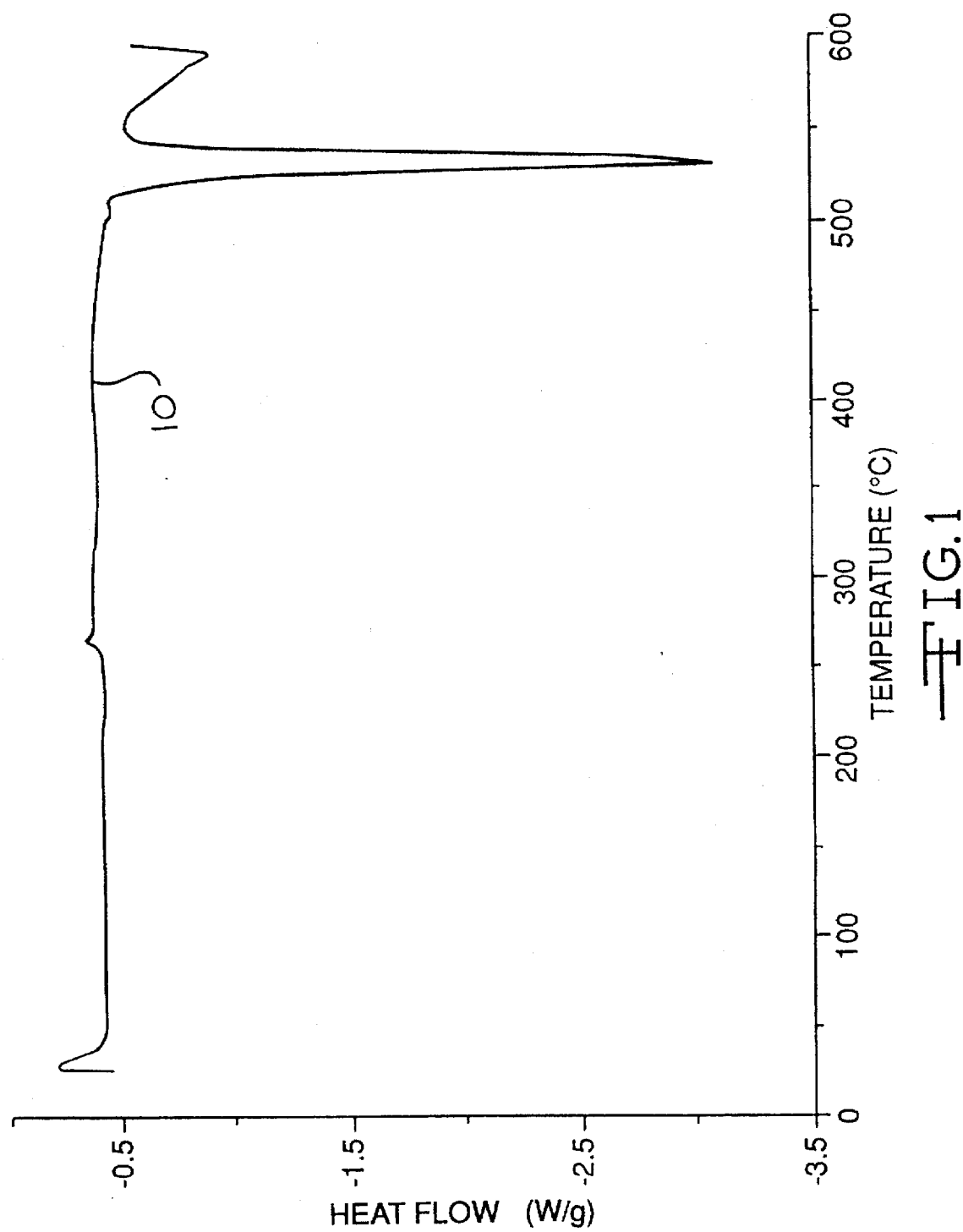
FIGS. 1 and 2 are graphs showing the results of Differential Scanning Calorimetry data obtained from CSVO materials made according to the present invention.

The electrochemical cell of the present invention comprises an anode of a metal selected from Group IA of the Periodic Table of the Elements, including lithium, sodium, potassium, etc., and their alloys and intermetallic compounds including, for example, Li-Si, Li-Al, Li-B and Li-Si-B alloys and intermetallic compounds. The preferred anode comprises lithium.

The form of the anode may vary, but typically, the anode is a thin sheet or foil of the anode metal, pressed or rolled on a metallic anode current collector, i.e. preferably comprising nickel, to form an anode component. In the electrochemical cell of the present invention, the anode component has an extended tab or lead of the same metal as the anode current collector, i.e., preferably nickel, integrally formed therewith such as by welding and contacted by a weld to a cell case of conductive metal in a case-negative configuration. Alternatively, the anode may be formed in some other geometry, such as a bobbin shape, cylinder or pellet to allow an alternate low surface cell design.

The electrochemical cell of the present invention further comprises a cathode, and the electrochemical reaction at the cathode involves conversion of ions which migrate from the anode to the cathode into atomic or molecular forms. The cathode of the present invention, therefore, includes an electronically conductive composite cathode material that comprises a mixture of a first metal oxide and a second metal nitrate incorporated in the matrix of a host metal oxide.

The cathode material of this invention can be constructed by the chemical addition reaction, or otherwise intimate contact of various metal oxides and/or metal nitrate combinations, preferably during thermal treatment, sol-gel formation, chemical vapor deposition or hydrothermal synthesis in mixed states. The materials thereby produced contain metals and oxides of the Groups IB, IIB, IIIB, IVB, VB, VIB, VIIB, and VIII which includes the noble metals and/or other oxide compounds.

Preferred cathode composites are prepared by thermally decomposing a vanadium salt such as ammonium metavanadate to produce vanadium pentoxide. The vanadium pentoxide is combined with a mixture of metal salts and metal oxides wherein the metal salts are preferably copper and silver salts such as copper nitrate, $Cu(NO_3)_2$, and silver nitrate, $AgNO_3$. More particularly the vanadium oxide is combined with nitrate and non-nitrate starting materials such as copper nitrate and silver oxide or copper oxide and silver nitrate, thoroughly mixed therewith and thereafter heated. Thus, the composite cathode material may be described as a metal-metal oxide metal oxide, and the range of material composition found for $Cu_xAg_yV_2O_z$ (CSVO) is preferably about $0.01 \leq x \leq 1.0$, about $0.01 \leq y \leq 1.0$ and about $5.01 \leq z \leq 6.5$.

A typical form of CSVO prepared from the above described nitrate/oxide starting materials is $Cu_{0.5}Ag_{0.5}V_2O_z$ with z being about 5.75, and is characterized by an endothermic transition at 535° C. in the differential scanning calorimetry data and d-spacings of 6.92, 5.37, 3.60, 3.43, 3.09, 3.07, and 1.93 in the X-ray powder diffraction pattern for the material. The oxygen content of this material can vary somewhat depending on preparation conditions, for example, whether the material is prepared in an oxidizing atmosphere or in an inert atmosphere such as in argon, nitrogen and helium, and the like.

Figure 3:
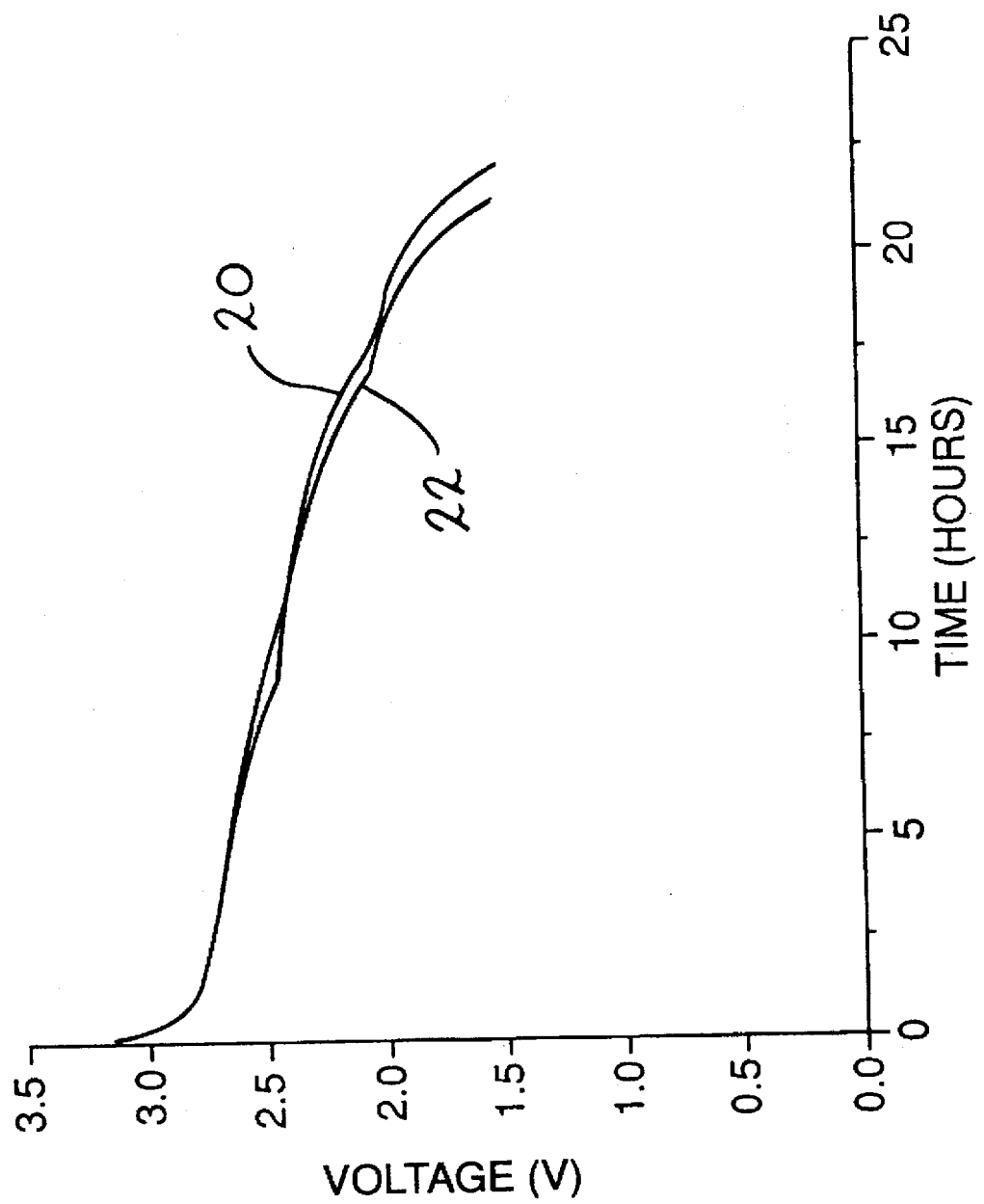
FIG. 3 is a voltage time plot comparing two alkali metal electrochemical cells, one according to the present invention having CSVO active material made from silver nitrate and copper oxide starting materials in comparison to a similar cell according to the present invention having the CSVO material made from copper nitrate and silver oxide starting materials.

The CSVO synthesized as described above having the stoichiometric formula $Cu_{0.5}Ag_{0.5}V_2O_z$ displays a bulk density of 1.56 g/ml and displays a characteristic sloping voltage versus time curve as indicated by curves 20 and 22 in FIG. 3. In particular, curve 20 was constructed from the discharge curve of a Li/CSVO cell having the cathode made from silver nitrate and copper oxide combined with vanadium oxide, and curve 22 was constructed from the discharge curve of a Li/CSVO cell having the cathode made from copper nitrate and silver oxide combined with vanadium oxide. The preparation of these cathodes will be described in detail hereinafter. The sloping discharge curve is of particular importance for batteries in implantable medical applications where a state of charge indication extrapolated from cell voltage is needed.

Another typical form of CSVO prepared according to the present invention has the stoichiometric formula $Cu_{0.16}Ag_{0.67}V_2O_z$ with z being about 5.5, and is characterized by an endothermic transition at 537° C. in the differential scanning calorimetry data and d-spacings of 4.36, 3.75, 3.59, 3.45, 3.20, 3.08, 3.03, 2.97 in the X-ray powder diffraction pattern for the cathode active material. This CSVO material has a bulk density of 1.36 g/ml, and likewise displays a characteristic sloping voltage versus time curve. Again, the exact proportion of the oxygen content is dictated by the preparation atmosphere.

Such composite materials as those described above may be pressed into a cathode pellet with the aid of a suitable binder material such as a fluoro-resin powder, preferably polytetrafluoroethylene (PTFE) powder, and a material having electronic conductive characteristics such as graphite and/or carbon black. In some cases, no binder material or electronic conductor material is required to provide a similarly suitable cathode body. Further, some of the cathode matrix samples may also be prepared by rolling, spreading or pressing a mixture of the material mentioned above onto a suitable current collector. Cathodes prepared as described above may be in the form of one or more plates operatively associated with at least one or more plates of anode material, or in the form of a strip wound with a corresponding strip of anode material in a structure similar to a "jellyroll".

The exemplary cell of the present invention further includes a separator to provide a physical separation between the anode and cathode active electrodes. The separator is of electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

Other separator materials that are useful with the present invention include woven fabric separators comprising halogenated polymeric fibers, as described in U.S. Pat. No. 5,415,959 to Pyszczek et al., which is assigned to the assignee of the present invention and incorporated herein by reference. Examples of halogenated polymeric materials suitable for the electrochemical cell of the present invention include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company and polyvinylidene fluoride.

The form of the separator typically is a sheet which is placed between the anode and cathode electrodes and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present invention is preferably activated with a nonaqueous, ionically conductive electrolyte operatively associated with the anode and the cathode electrodes. The electrolyte serves as a medium for migration of ions between the anode and the cathode during the electrochemical reactions of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

The nonaqueous solvents suitable for the present invention are chosen so as to exhibit those physical properties necessary for ionic transport (low viscosity, low surface tension and wettability). Suitable nonaqueous solvents may be any one or more of the organic solvents which are substantially inert to the anode and cathode electrode materials, such as tetrahydrofuran, propylene carbonate, methyl acetate, diglyme, triglyme, tetraglyme, acetonitrile, dimethyl sulfoxide, dimethyl formamide, dimethyl acetamide, 1,2-dimethoxyethane and others. A preferred solvent comprises a 50/50 mixture (by volume) of propylene carbonate (PC) and dimethoxyethane (DME).

The preferred electrolyte of the present invention comprises an inorganic salt having the general formula $MM'F_6$ wherein M is an alkali metal similar to the alkali metal comprising the anode and M' is an element selected from the group consisting of phosphorous, arsenic and antimony. Examples of salts yielding $M'F_6$ are: hexafluorophosphate ($PF_6$), hexafluoroarsenate ($AsF_6$) and hexafluoroantimonate ($SbF_6$). More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. Thus, in the case of an anode comprising lithium, the alkali metal salt of the electrolyte preferably comprises either lithium hexafluoroarsenate or lithium hexafluorophosphate dissolved in a 50/50 solvent mixture (by volume) of PC/DME. For a more detailed description of a nonaqueous electrolyte for use in the exemplary cell of the present invention, reference is made to U.S. patent application Ser. No. 08/342,432, which is assigned to the assignee of the present invention and incorporated herein by reference.

One preferred form of the cell assembly described herein is referred to as a wound element cell. That is, the fabricated cathode, anode and separator are wound together in a "jellyroll" end type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/ terminal pin feedthrough and a hole for electrolyte filling. The glass used is a corrosion resistant type having from between about 0% to about 50% by weight silicon such as CABAL 123, TA 23 or FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte described hereinabove and hermetically sealed such as by close-welding a stainless steel ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

The electrochemical cell of the present invention operates in the following manner. When the ionically conductive electrolyte becomes operatively associated with the anode and the cathode of the cell, an electrical potential difference is developed between terminals operatively connected to the anode and the cathode. During discharge, the electrochemical reaction at the anode includes oxidation to form metal ions and the electrochemical reaction at the cathode involves conversion of these ions which migrate from the anode into atomic or molecular forms. It is observed that the electrochemical cell of this invention has a wide operating temperature range of about −20° C. to +70° C. Advantages of the CSVO cathode material according to the present invention include a high delivered capacity for the intercalation of lithium and reduced voltage delay under high rate applications, such as in batteries for implantable cardiac defibrillators, together with the cost saving resulting from the reduced amount of silver as starting material.

The electrochemical cell according to the present invention is illustrated further by the following examples.

EXAMPLE I

Commercially available ammonium vanadate, $NH_4VO_5$ (Cerac, 99.99%, −80 mesh) was thermally decomposed to vanadium pentoxide, $V_2O_5$, in an air furnace at elevated temperatures. Evidence of the complete decomposition was based upon the distinct lack of $NH_{3(g)}$ and the comparison of product yield to the theoretical yield for $V_2O_5$.

Silver nitrate, $AgNO_3$ (4.56 g, 0.027 mol) was dissolved in 15 mL of deionized/distilled water. The aqueous salt solution was added to a mixture of solid copper(II) oxide, CuO (2.13 g, 0.027 mol) and the previously prepared solid vanadium oxide $V_2O_5$ (9.76 g, 0.054 mol), and the resulting slurry was heated to about 80° C. to 120° C. to evaporate all of the water. During this time, the slurry was mixed intermittently until the sample became a dry powder. This powder was ground to thoroughly mix the components. The solid was heated at about 230° C. under an oxidizing atmosphere for at least 30 minutes, and mixed again. The temperature of the oven was then increased to about 260° C. for at least 16 hours. The material was then ground again, and heated at about 375° C. for not less than 24 hours. Upon cooling, the material was used without further preparation.

This cathode active material had the stoichiometric formula of $Cu_{0.5}Ag_{0.5}V_2O_z$ with z being about 5.75. The oxygen content in $Cu_{0.5}Ag_{0.5}V_2O_z$ is designated by z of about 5.75 since the exact stoichiometry of oxygen depends on the conditions and methods used in preparation of the material. Using similar starting materials with the preparation taking place in an inert atmosphere such as nitrogen, argon or helium, the oxygen content of the above cathode active material is somewhat less than 5.75.

EXAMPLE II

Copper nitrate, $Cu(NO_3)_2 \cdot 2.5H_2O$ (6.24 g, 0.027 mol) was dissolved in 10 mL of deionized/distilled water. The aqueous salt solution was added to a mixture of solid silver oxide $Ag_2O$ (3.10 g, 0.0135 mol) and solid vanadium oxide, $V_2O_5$ (9.76 g, 0.054 mol). The resulting slurry was mixed well and thermally treated as described in Example I. This metal oxide/metal nitrate salt mixture may also be taken up as a slurry in an aqueous or nonaqueous solvent, mixed thoroughly and dried as described in Example I.

EXAMPLE III

Thermal analysis of materials

Figure 2:
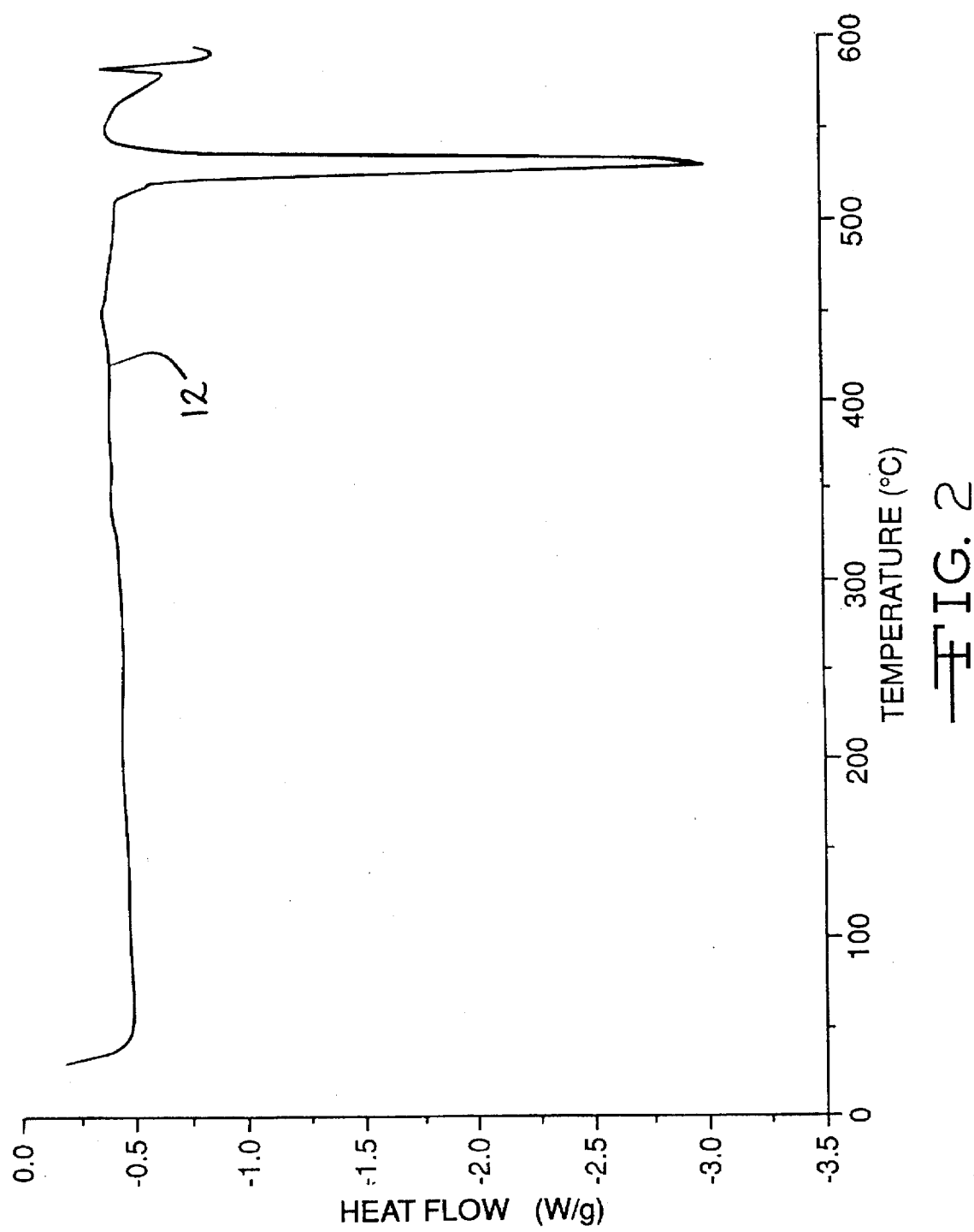

Differential Scanning Calorimetry (DSC) data was obtained for the CSVO samples made according to Examples I and II. The results of scans from about 25° C. to 600° C. are presented in FIG. 1 and indicated by curve 10 for CSVO made from silver nitrate and copper oxide combined with vanadium oxide as set forth in Example I, and in FIG. 2 and indicated by curve 12 for CSVO made from copper nitrate and silver oxide combined with vanadium oxide as set forth in Example II. Both samples only display a single endothermic transition at 535° C., demonstrating that CSVO made according to the methods of the present invention, i.e. made from copper nitrate and silver oxide or silver nitrate and copper oxide combined with vanadium oxide are similar.

COMPARATIVE EXAMPLE I

Copper silver vanadium oxide (CSVO) was synthesized via a solid-state reaction of thermally decomposable salts of copper and silver with vanadium pentoxide. Particularly, silver nitrate, $AgNO_3$ (12.49 g, 0.074 mol) and copper(II) nitrate hydrate, $Cu(NO_3)_2 \cdot 3H_2O$ (17.88 g, 0.074 mol) were dissolved in 25 ml of deionized/distilled water. The aqueous salt solution was added to solid vanadium pentoxide, $V_2O_5$ (26.74 g, 0.147 mol) prepared as described in Example I and the resulting slurry was heated to about 80° C. to 120° C. to evaporate all of the water. During this time, the slurry was mixed intermittently until the sample became a dry powder. This powder was ground to thoroughly mix the components. The solid was heated at about 230° C. under an oxidizing atmosphere for at least 30 minutes, and mixed again. The temperature of the oven was then increased to about 260° C. for at least 2 hours, followed by heating at about 300° C. for at least 16 hours. The material was then ground again, and heated at about 375° C. for not less than 24 hours. Upon cooling, the material was used without further preparation.

It was determined that the thusly prepared material had the stoichiometric formation of $Cu_{0.5}Ag_{0.5}V_2O_z$ with z being about 5.75. The oxygen content in $Cu_{0.5}Ag_{0.5}V_2O_z$ is designated by z of about 5.75 since the exact stoichiometry of oxygen depends on the conditions and method used in preparation of the material. For a more detailed description of CSVO made from silver nitrate and copper nitrate starting materials combined with vanadium pentoxide, reference is made to U.S. Pat. No. 5,472,810 to Takeuchi et al., which is assigned to the assignee of the present invention and incorporated herein by reference.

COMPARATIVE EXAMPLE II

Preparation of $Cu_{0.5}Ag_{0.5}V_2O_z$ from metal oxides

Silver oxide, $Ag_2O$ (21.73 g, 0.094 mol) and copper(II) oxide, CuO (14.91 g, 0.188 mol) was added to 80 mnl of deionized/distilled water. The aqueous slurry was added to solid vanadium pentoxide, $V_2O_5$ (68.20 g, 0.375 mol). The resulting slurry was heated to about 80° C. to 120° C. to evaporate all of the water. During this time the slurry was mixed intermittently until the sample became a dry powder. This dry powder sample was mixed well and thermally treated as described in Example I. The resulting cathode active material had the stoichiometric formula $Cu_{0.5}Ag_{0.5}V_2O_z$ with z being about 5.75.

Copper materials may be used in either the copper(II), copper(I) or copper(O) oxidation state. Likewise, silver materials may be in either the silver(II), silver(I) or silver(O) oxidation state. For a more detailed discussion of CSVO cathode active material made from copper oxide and silver oxide starting materials, reference is made to U.S. Pat. No. 5,472,810 to Takeuchi et al., which is assigned to the assignee of the present inventor and incorporated herein by reference.

EXAMPLE IV

Experimental cells were used to test the ability of CSVO made according to Examples I and II to intercalate lithium under constant resistance discharge, current pulse, or a combination of these test conditions. In addition, test cells were constructed using CSVO made according to Comparative Examples I and II. The test cells fabricated according to Comparative Example II contained CSVO cathode active material made with copper oxide and silver oxide starting materials and from copper powder and silver powder starting materials.

In each case, the cell design utilized a cathode in the form of a pellet having a length of 3.6 cm, a width of 1.4 cm, and a thickness of about 0.06 cm. The cathode consisted of a mixture of 94% of active material, by weight, along with 3% polytetrafluoroethylene, 2% graphite, and 1% carbon black. The mixture was pressed onto an expanded metal current collector, and the cathode separated from the lithium anode by a polypropylene separator. Lithium metal (1.4 cm×3.6 cm×0.08 cm), also in contact with an expanded metal current collector, was placed against the separator facing the CSVO cathode. Both electrodes were surrounded by glass plates and held together by small metal clamps. The electrodes were placed in a glass enclosure and filled with a 1 molar solution of lithium hexafluoroarsenate ($LiAsF_6$) dissolved in an equal volume mixture of propylene carbonate (PC) and 1,2-dimethoxyethane (DME) as electrolyte. The test cells were capped to avoid the evaporation of DME electrolyte.

EXAMPLE V

The test cells described in Example IV were discharged at room temperature under a constant 200 ohm load down to a voltage of +1.5 V vs $Li/Li^+$, corresponding to the intercalation of $Li^+$ into the cathode material. The voltage of test cells using CSVO from Example I and from Example II are plotted as a function of time during the 200 ohm discharge in FIG. 3. In particular, the discharge curve for the cell having CSVO made according to Example I is indicated by curve 20 in FIG. 3 and that for the cell having CSVO made according to Example II is indicated by curve 22 in this figure. The capacity values from these discharged cells are listed in Table 1. From this, it can be seen that the CSVO made according the various preparation techniques of the present invention are similar.

TABLE 1

| | Starting Material | | Capacity of CSVO | |
|---|---|---|---|---|
| | copper | silver | To +2.0 V | To +1.5 V |
| Example | | | | |
| I | CuO | $AgNO_3$ | 283 Ah/kg | 329 Ah/kg |
| II | $Cu(NO_3)_2$ | $Ag_2O$ | 297 Ah/kg | 344 Ah/kg |
| Comparative | | | | |
| I | $Cu(NO_3)_2$ | $AgNO_3$ | 290 Ah/kg | 327 Ah/kg |
| II | CuO | $Ag_2O$ | 245 Ah/kg | 309 Ah/kg |
| | $Cu°$ powder | $Ag°$ powder | 192 Ah/kg | 235 Ah/kg |

Figure 4:
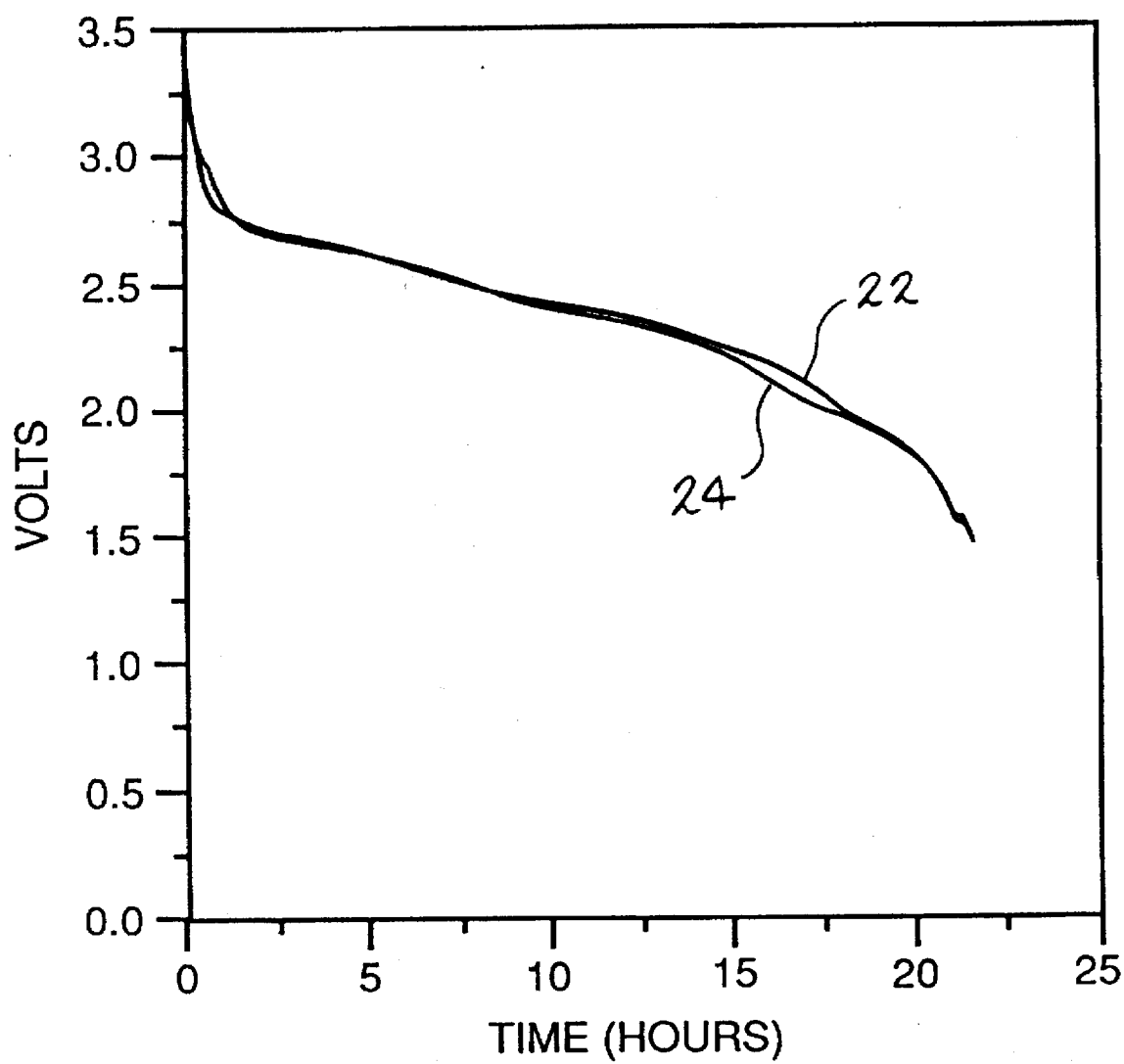
FIG. 4 is a voltage-time plot comparing two alkali metal electrochemical cells, one having a cathode including CSVO active material made from nitrate starting materials in comparison to a similar cell having the CSVO material made from a mixture of copper nitrate and silver oxide starting materials according to the present invention.

In FIG. 4, the discharge curve for the Li/CSVO test cell having the cathode active material made according to Example II is compared to the voltage-time results for a Li/CSVO cell having the cathode active material made according to Comparative Example I. The discharge curve for the test cell having the cathode active material made according to Example II is indicated by curve 22 in FIG. 4 and that for the cell having the cathode material made accordingly to Comparative Example I is indicated by curve 24 in the same figure. The cells containing the CSVO cathode material made according to the present invention displayed an increase in delivered capacity over that seen for CSVO made from copper and silver nitrate starting materials, as listed in Table 1 above.

Figure 5:
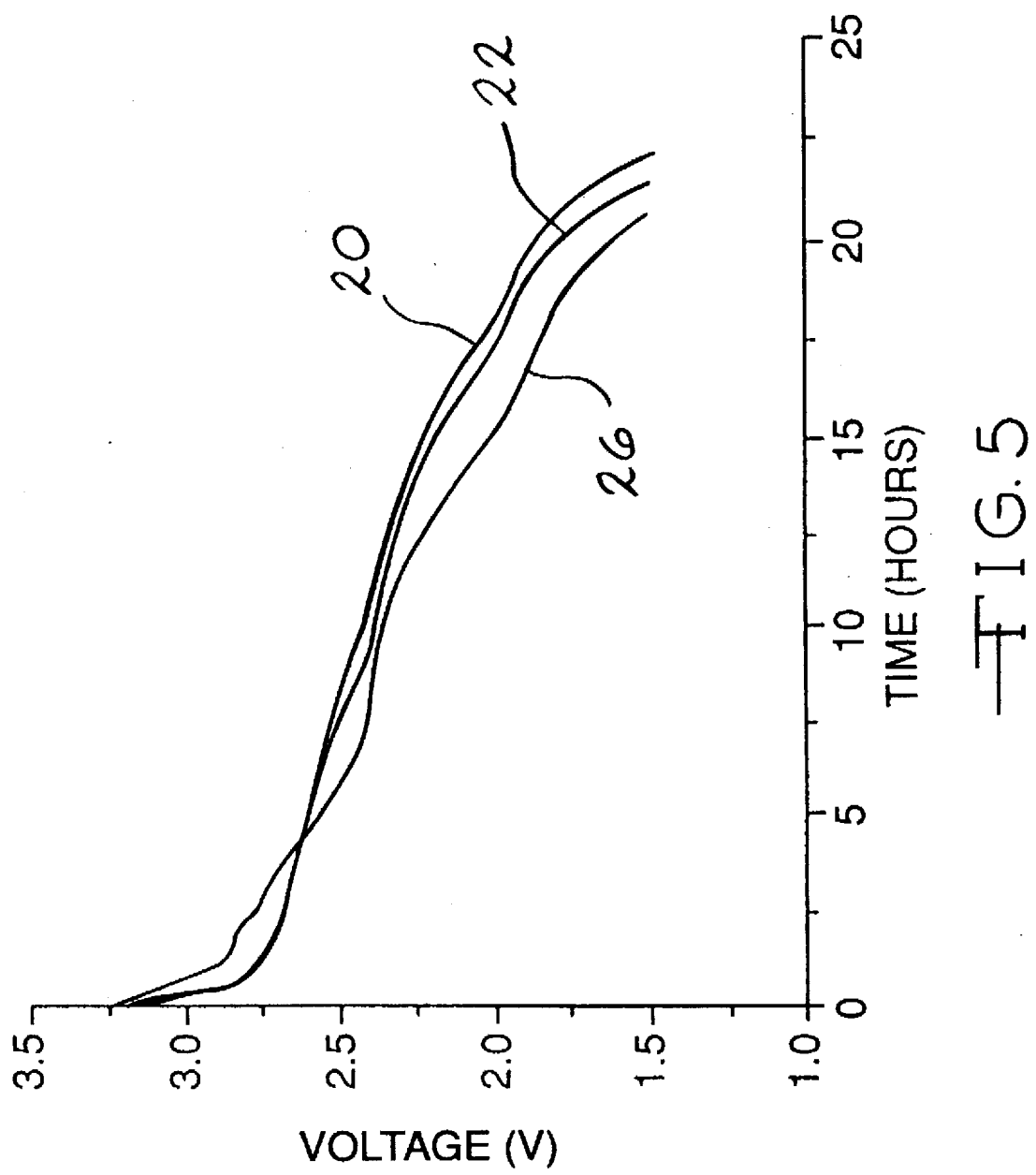
FIG. 5 is a voltage-time plot comparing three alkali metal electrochemical cell, one each having a cathode including CSVO active material made from mixtures of a copper nitrate and silver oxide, or a copper oxide and silver nitrate according to the present invention in comparison to a similar cell having the CSVO material made from a mixture of copper oxide and silver oxide starting materials.

In FIG. 5, the discharge curves for the Li/CSVO test cell having the cathode active material made according to Examples I and II are compared to the voltage-time results for a Li/CSVO cell having the cathode active material made according to Comparative Example II. The discharge curve for the test cell having the cathode active material made according to Example I is indicated by curve 20 in FIG. 5, the discharge curve for the test cell having the cathode active material made according to Example II is indicated by curve 22 in this figure, and that for the cell having the cathode material made according to Comparative Example II is indicated by curve 26. As with the results obtained with respect to the CSVO material made according to Comparative Example I, the cells containing the CSVO cathode material made according to the present invention displayed an increase in delivered capacity over that seen for CSVO made from copper oxide and silver oxide starting materials, as listed on Table 1 above.

The capacity values in Table 1 are based on the amount of active material in the cathode.

EXAMPLE VI

Pulse testing of experimental cells

The test cells described in Example IV were built using CSVO from Examples I and II and CSVO from Comparative Example I. These cells were discharged via constant resistance discharge combined with constant current pulse testing. Current pulses of 0.19 Amps were applied for 10 seconds in duration followed by 15 seconds of open circuit rest between pulses. These pulses were applied in groups of four, with approximately 2 hours of constant resistance (200 Ω) discharge between pulse groups. The results of the pulse testing are presented in Table 2.

Figure 6:
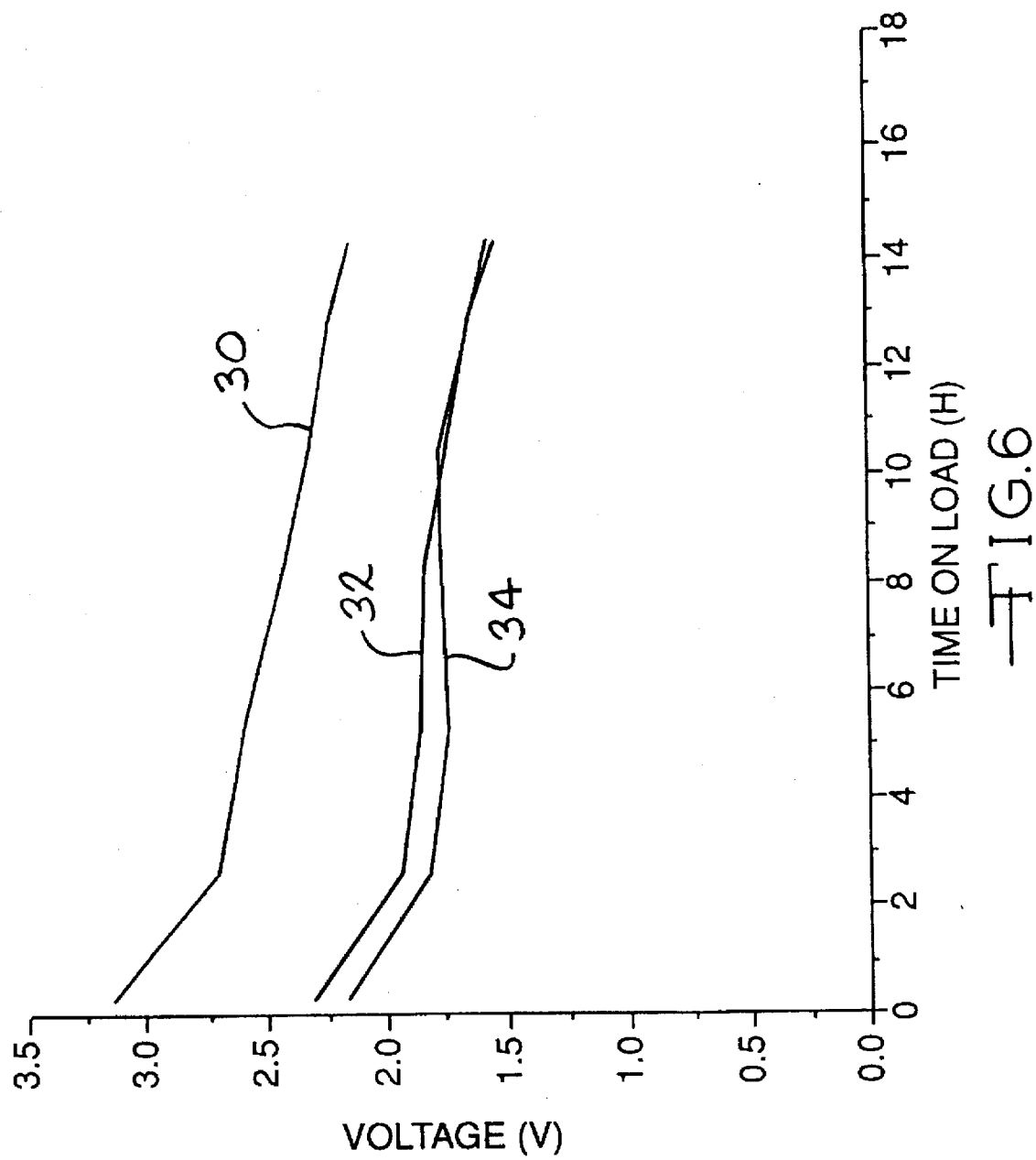
FIGS. 6 and 7 are voltage-time plots of cells each having a cathode comprising CSVO made according to the present invention showing pre-pulse voltage and minimum pulse voltages.
Figure 7:
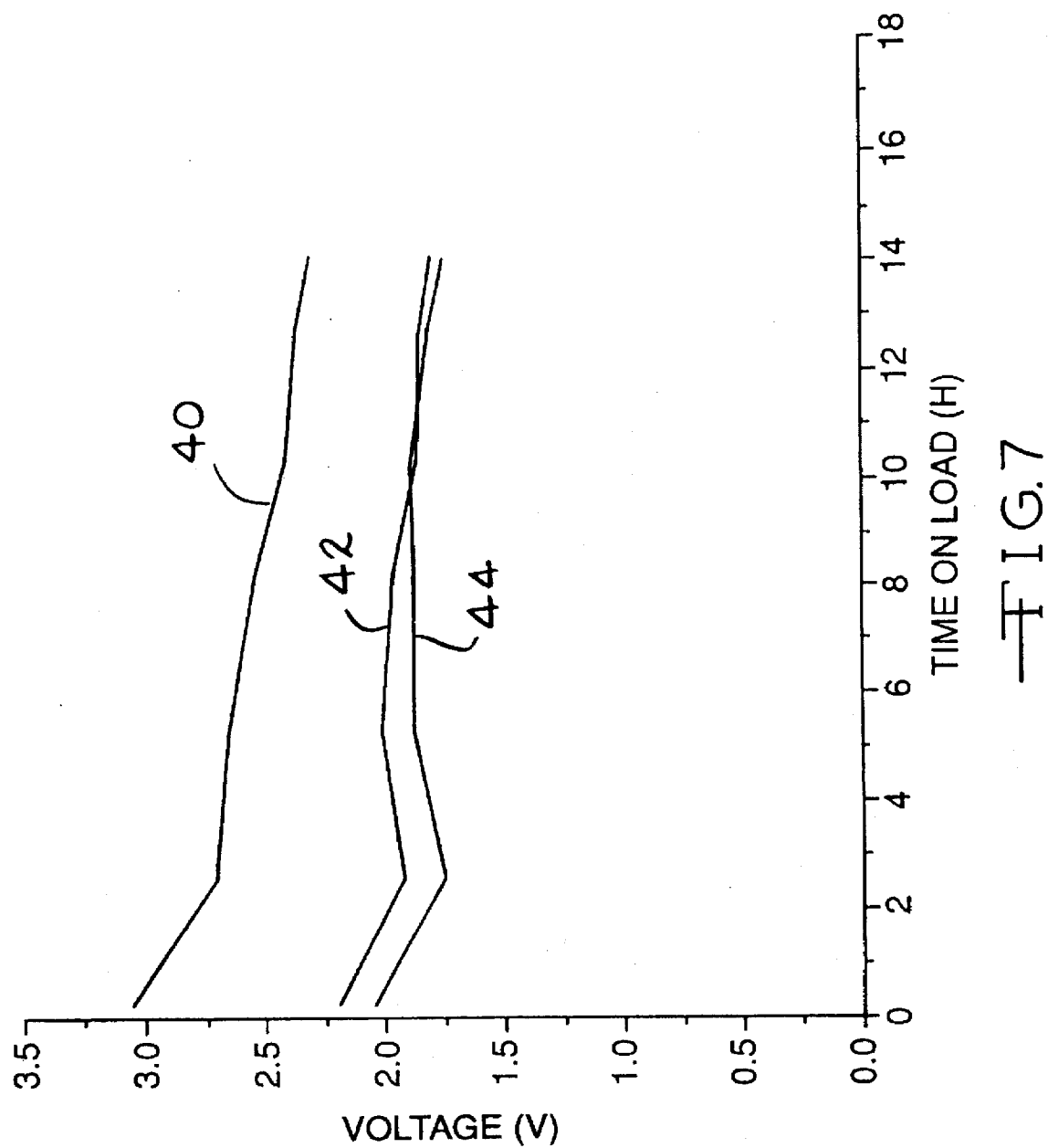
Figure 8:
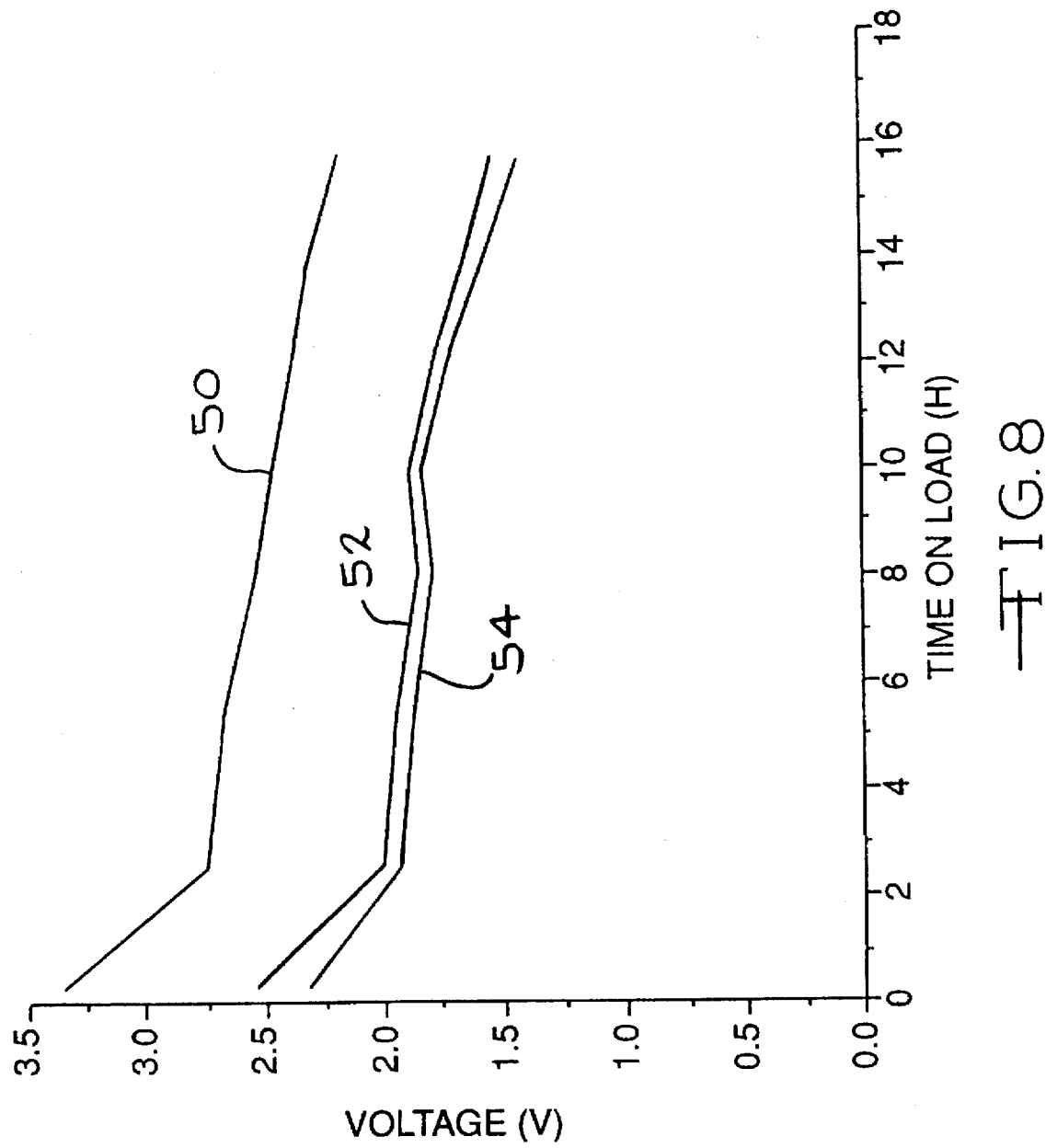
FIG. 8 is a voltage-time plot of a cell having a cathode comprising CSVO made from copper nitrate and silver nitrate starting materials according to the prior art and showing open circuit voltage and minimum pulse voltage.

Additionally, the plotted pre-pulse voltage for a Li/CSVO test cell containing $Cu_{0.5}Ag_{0.5}V_2O_z$ with z being about 5.75 made according to Example I is indicated as curve 30 in FIG. 6, the minimum voltage for the first pulse of this cell is indicated as curve 32 and the fourth pulse is indicated by curve 34 in this figure. Similarly, the plotted pre-pulse voltage for a Li/CSVO test cell containing $Cu_{0.5}Ag_{0.5}V_2O_z$ with z being about 5.75 made according to Example II is indicated as curve 40 in FIG. 7, the minimum voltage for the first pulse of this cell is indicated as curve 42 and the fourth pulse is indicated by curve 44 in this figure. In comparison, the plotted pre-pulse voltage of a Li/CSVO test cell containing $Cu_{0.5}Ag_{0.5}V_2O_z$ with z being about 5.75 made according to Comparative Example I is indicated as curve 50 in FIG. 8, the minimum voltage for the first pulse of this cell is indicated as curve 52 and the fourth pulse is indicated by curve 54 in this figure.

TABLE 2

| | Starting Material | | Capacity of CSVO |
|---|---|---|---|
| | copper | silver | To +1.5 V |
| Example | | | |
| I | CuO | $AgNO_3$ | 207 mAh |
| II | $Cu(NO_3)_2$ | $Ag_2O$ | 230 mAh |
| Comparative | | | |
| I | $Cu(NO_3)_2$ | $AgNO_3$ | 203 mAh |

As is apparent, pulse testing of the experimental cells at room temperature using CSVO from Examples I and II demonstrated improvements in reduced voltage delay similar to those exhibited by pulse discharging a cell employing CSVO from Comparative Example I.

EXAMPLE VII

Silver nitrate, $AgNO_3$, (6.10 g, 0.036 mol) is dissolved in 20 mL of deionized/distilled water. The aqueous salt solution is added to a mixture of solid copper(II) oxide, CuO (0.682 g, 0.009 mol) and the previously prepared solid vanadium oxide $V_2O_5$ (9.76 g, 0.054 mol), and the resulting slurry is heated to about 80° C. to 120° C. to evaporate all of the water. During this time, the slurry is mixed intermittently until the sample becomes a dry powder. This powder is ground to thoroughly mix the components. The solid is heated at about 230° C. under an oxidizing atmosphere for at least 30 minutes, and mixed again. The temperature of the oven is then increased to about 260° C. for at least 16 hours. The material is then ground again, and heated at about 375° C. for not less than 24 hours. Upon cooling, the material is used without further preparation. This cathode active material had the stoichiometric formula of $Cu_{0.16}Ag_{0.67}V_2O_z$ with z being about 5.5.

The oxygen content in $Cu_{0.16}Ag_{0.67}V_2O_z$ is designated by z of about 5.5 since the exact stoichiometry of oxygen depends on the conditions and methods used in preparation of the material. Using similar starting materials with the preparation taking place in an inert atmosphere, the oxygen content of the above cathode active material is somewhat less than 5.5.

EXAMPLE VIII

Copper nitrate, $Cu(NO_3)_2 \cdot 2.5H_2O$ (1.99 g, 0.009 mol) is dissolved in 5 mL of deionized/distilled water. The aqueous salt solution is added to a mixture of solid silver oxide $Ag_2O$ (4.16 g, 0.018 mol) and solid vanadium oxide, $V_2O_5$ (9.76 g, 0.054 mol). The resulting slurry is mixed well and thermally treated as described in Example VII. This metal oxide/metal nitrate salt mixture may also be taken up as a slurry in an aqueous or nonaqueous solvent, mixed thoroughly and dried as described in Example VII.

COMPARATIVE EXAMPLE III

Comparative test cells were constructed using CSVO having the stoichiometric proportion between x and y in the general formula $Cu_xAg_yV_2O_z$ such that x was greater than y. These comparative cells were then discharged under a similar regime as set forth in Example VI and the results are presented in Table 3.

TABLE 3

| Cathode Material | Capacity | |
|---|---|---|
| | To +2.0 V | To +1.5 V |
| $Cu_{2.0}Ag_{0.47}V_2O_z$ | 240 Ah/kg (563 Wh/kg) | 296 Ah/kg (653 Wh/kg) |
| $Cu_{0.42}Ag_{0.16}V_2O_z$ | (530 Wh/kg) | (650 Wh/kg) |

Figure 9:
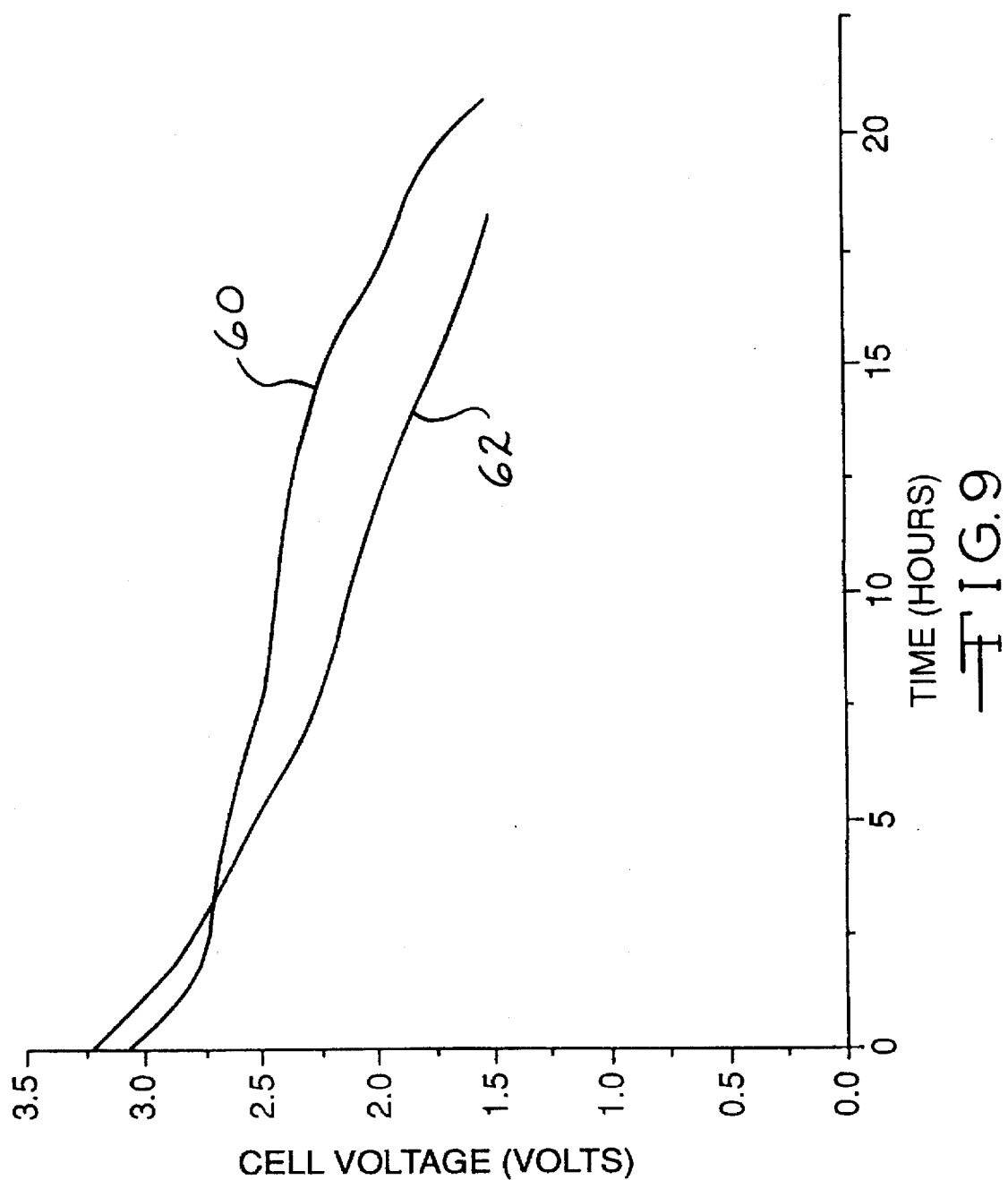
FIG. 9 is a voltage-time plot comparing cells having a cathode comprising CSVO made according to the present invention and having CSVO with the stoichiometric proportion between x and y such that y was greater than x.

The voltage-time results of a test cell using the $Cu_{0.5}Ag_{0.5}V_2O_z$ cathode material from Example I is presented in FIG. 9 and indicated as curve 60. The voltage-time results for a similarly constructed comparative test cell using $Cu_{0.42}Ag_{0.16}V_2O_z$ cathode material, i.e., having x greater than y in the general formula is presented in FIG. 9 and indicated as curve 62.

The results of this test clearly demonstrates the improved energy capacity of a composite oxide matrix material made from the claimed metal oxide and metal nitrate materials combined with vanadium oxide and having the preferred stoichiometric range, namely $x \leq y$ in the formula $Cu_xAg_yV_2O_z$.

The above detailed description and examples are intended for purposes of illustrating the invention and are not to be construed as limited.

What is claimed is:

1. An electrochemical cell having an anode of a Group IA metal which is electrochemically oxidized to form metal ions in the cell upon discharge to generate an electron flow in an external electrical circuit connected to the cell, a cathode of electronically conductive material, and an ionically conductive electrolyte solution activating the anode and the cathode, the cathode comprising a metal oxide matrix material characterized as a reaction product of vanadium oxide and a mixture of either a copper nitrate and a silver oxide or a copper oxide and a silver nitrate, the metal oxide matrix material having the general formula $Cu_xAg_yV_2O_z$ wherein $0.01 \leq x \leq 1.0$, $0.1 \leq y \leq 1.0$ and $5.01 \leq z \leq 6.5$.

2. The electrochemical cell of claim 1 wherein in the general formula $x \leq y$.

3. An electrochemical cell having an anode of a Group IA metal which is electrochemically oxidized to form metal ions in the cell upon discharge to generate an electron flow in an external electrical circuit connected to the cell, a cathode of electronically conductive material, and an ionically conductive electrolyte solution activating the anode and the cathode, the cathode comprising a metal oxide matrix material characterized as a reaction product of vanadium oxide and a mixture of either a silver oxide and a copper nitrate, or a copper oxide and a silver nitrate, wherein the metal oxide matrix material has a stoichiometric formulation consisting of either $Cu_{0.16}Ag_{0.67}V_2O_z$ with z being about 5.5 or $Cu_{0.5}Ag_{0.5}V_2O_z$ with z being about 5.75.

4. The electrochemical cell of claim 3 wherein the mixture of the copper nitrate and the silver oxide includes silver in either the silver(II), silver(I) or silver(O) oxidation states.

5. The electrochemical cell of claim 3 wherein the mixture of the silver nitrate and the copper oxide includes copper in either the copper(II), copper(I) or copper(O) oxidation states.

6. The electrochemical cell of claim 3 wherein one component of the metal oxide matrix material comprises $V_2O_z$ with $0<z \leq 5$.

7. The electrochemical cell of claim 3 wherein the metal oxide matrix material is prepared from starting materials comprising either the silver oxide and the copper nitrate, or the copper oxide and the silver nitrate reacted with the vanadium oxide by one of the group consisting of a thermal treatment, sol-gel formation, chemical vapor deposition and hydrothermal synthesis of the starting materials.

8. The electrochemical cell of claim 3 wherein the cathode further comprises a binder material.

9. The electrochemical cell of claim 8 wherein the binder material is a fluoro-resin powder.

10. The electrochemical cell of claim 3 wherein the cathode further comprises a conductive additive material.

11. The electrochemical cell of claim 10 wherein the conductive additive material is selected from the group consisting of carbon, graphite and a combination thereof.

12. The electrochemical cell of claim 3 wherein the electrolyte solution comprises a Group IA metal salt dissolved in a nonaqueous solvent.

13. The electrochemical cell of claim 12 wherein the nonaqueous solvent comprises an inorganic solvent.

14. The electrochemical cell of claim 12 wherein the nonaqueous solvent comprises an organic solvent.

15. The electrochemical cell of claim 3 wherein the metal oxide matrix material having the stoichiometric formulation $Cu_{0.16}Ag_{0.67}V_2O_{5.5}$ is characterized by an endothermic transition in differential scanning calorimetry data at about 537° C.

16. The electrochemical cell of claim 3 wherein the metal oxide matrix material having the stoichiometric formulation $Cu_{0.5}Ag_{0.5}V_2O_{5.75}$ is characterized by an endothermic transition in differential scanning calorimetry data at about 535° C.

17. A cathode for an electrochemical cell, the cathode comprising a metal oxide matrix material characterized as a reaction product formed by either a thermal decomposition reaction or a thermal addition reaction of vanadium oxide and a mixture of either a copper nitrate and a silver oxide or a copper oxide and a silver nitrate, the metal oxide matrix material having the general formula $Cu_xAg_yV_2O_z$ wherein $0.01 \leq x \leq 1.0$, $0.1 \leq y \leq 1.0$ and $5.01 \leq z \leq 6.5$.

18. The cathode of claim 17 wherein in the general formula $x \leq y$.

19. A cathode for an electrochemical cell comprising a metal oxide matrix material characterized as a reaction product formed by either a thermal decomposition reaction or a thermal addition reaction of vanadium oxide and a mixture of either a silver oxide and a copper nitrate, or a copper oxide and a silver nitrate, and wherein the metal oxide matrix material has a stoichiometric formulation consisting of either $Cu_{0.16}Ag_{0.67}V_2O_z$ with z being about 5.5 or $Cu_{0.5}Ag_{0.5}V_2O_z$ with z being about 5.75.

20. The cathode of claim 19 wherein one component of the metal oxide matrix material comprises $V_2O_z$ with $0<z<5$.

21. The cathode of claim 19 wherein the mixture of the copper nitrate and the Silver oxide includes silver in either the silver(II), silver(I) or silver(O) oxidation states.

22. The cathode of claim 19 wherein the mixture of the silver nitrate and the copper oxide includes copper in either the copper(II), copper(I) or copper(O) oxidation states.

23. The cathode of claim 19 wherein the metal oxide matrix material is formed as a reaction product of a thermal treatment of decomposable compounds comprising vanadium oxide and the mixture of either the silver oxide and the copper nitrate, or the copper oxide and the silver nitrate.

24. The cathode of claim 19 wherein the metal oxide matrix material is formed by either a thermal decomposition reaction or a thermal addition reaction of vanadium oxide and the mixture of either the silver oxide and the copper nitrate, or the copper oxide and the silver nitrate.

25. The cathode of claim 19 wherein the metal oxide matrix material is prepared from starting materials comprising vanadium oxide and the mixture of either the silver oxide and the copper nitrate, or the copper oxide and the silver nitrate reacted together by one of the group consisting of a thermal treatment, sol-gel formation, chemical vapor deposition and hydrothermal synthesis.

26. The cathode of claim 19 wherein the cathode further comprises a binder material.

27. The cathode of claim 25 wherein the binder material is a fluoro-resin powder.

28. The cathode of claim 19 wherein the cathode further comprises a conductive additive material.

29. The cathode of claim 28 wherein the conductive additive material is selected from the group consisting of carbon, graphite and a combination thereof.

30. The cathode of claim 19 wherein the metal oxide matrix material having the stoichiometric formulation $Cu_{0.16}Ag_{0.67}V_2O_{5.5}$ is characterized by an endothermic transition in differential scanning calorimetry data at about 537° C.

31. The cathode of claim 19 wherein the metal oxide matrix material having the stoichiometric formulation $Cu_{0.5}Ag_{0.5}V_2O_{5.75}$ is characterized by an endothermic transition in differential scanning calorimetry data at about 535° C.

32. A method of making a cathode for an electrochemical cell, the cathode comprising a metal oxide matrix material, which method comprises:

a) combining vanadium oxide with a mixture comprising either a silver oxide and a copper nitrate, or a copper oxide and a silver nitrate to provide a metal oxide matrix admixture;

b) reacting the metal oxide matrix admixture to provide the metal oxide matrix material having the general formula $Cu_xAg_yV_2O_z$ wherein $0.01 \leq x \leq 1.0$, $0.1 \leq y \leq 1.0$ and $5.01 \leq z \leq 6.5$; and c) forming the metal oxide matrix material into the cathode.

33. A method of making a cathode for an electrochemical cell, the cathode comprising a metal oxide matrix material, which method comprises:

a) admixing vanadium oxide with a mixture comprising either a silver oxide and a copper nitrate, or a copper oxide and a silver nitrate to provide a metal oxide matrix admixture;

b) reacting the metal oxide matrix admixture to provide the metal oxide matrix material having a stoichiometric formulation consisting of either $Cu_{0.16}Ag_{0.67}V_2O_z$ with z being about 5.5 or $Cu_{0.5}Ag_{0.5}V_2O_z$ with z being about 5.75; and c) forming the metal oxide matrix material into the cathode.

34. A method of making a cathode for an electrochemical cell, the cathode comprising a metal oxide matrix material, which method comprises:

a) combining vanadium oxide with a mixture comprising either a silver oxide and a copper nitrate, or a copper oxide and a silver nitrate to provide a metal oxide matrix admixture;

b) heating the admixture with the resulting metal oxide matrix material having a stoichiometric formulation consisting of either $Cu_{0.16}Ag_{0.67}V_2O_z$ with z being about 5.5 or $Cu_{0.5}Ag_{0.5}V_2O_z$ with z being about 5.75; and c) forming the metal oxide matrix material into the cathode.

* * * * *